United States Patent [19]

Guarino et al.

[11] Patent Number: 4,673,101

[45] Date of Patent: Jun. 16, 1987

[54] EVACUABLE CHAMBER ENCLOSING

[75] Inventors: Nicholas Guarino, Arlington; Gabriel Onorio, Gloucester; Billy W. Ward, Rockport, all of Mass.

[73] Assignee: Micrion Limited Partnership, Beverly, Mass.

[21] Appl. No.: 861,046

[22] Filed: May 8, 1986

[51] Int. Cl.⁴ .............................................. B65D 43/24
[52] U.S. Cl. ..................................... 220/335; 220/260
[58] Field of Search ............... 220/260, 263, 264, 334, 220/335, 345

[56] References Cited

U.S. PATENT DOCUMENTS

| | | | |
|---|---|---|---|
| 4,097,145 | 6/1978 | Luperti et al. | 220/335 |
| 4,362,118 | 12/1982 | Koch, Jr. et al. | 220/335 |
| 4,365,893 | 12/1982 | Kimura et al. | 220/335 |
| 4,372,461 | 2/1983 | Lerman et al. | 220/260 |

*Primary Examiner*—George T. Hall
*Attorney, Agent, or Firm*—Charles Hieken

[57] ABSTRACT

An evacuable vessel having a heavy cylindrical wall seated on a generally square base has a heavy cover hinged at one end to a hinge support attached to the wall. The cover is bolted to the wall in the closed position and sealed by an O-ring. The hinge bolts are seated in a slotted hole to allow the cover to pivot about the O-ring when closing. Adjustable set screws may be used to tighten the hinge arms and introduce a selected degree of friction. Springs are connected between the outside end of each hinge arm and the base.

2 Claims, 8 Drawing Figures

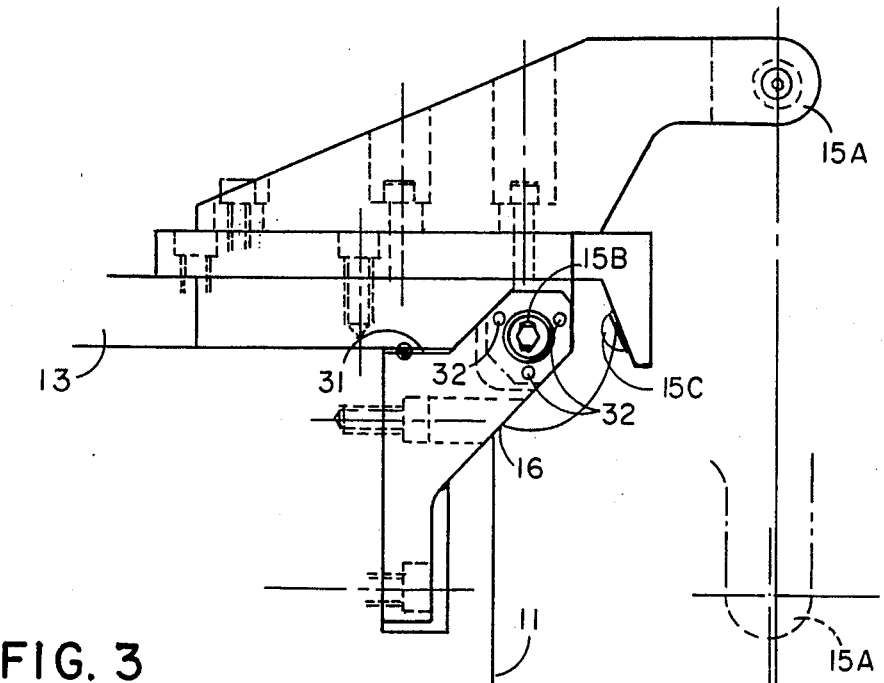
FIG. 3
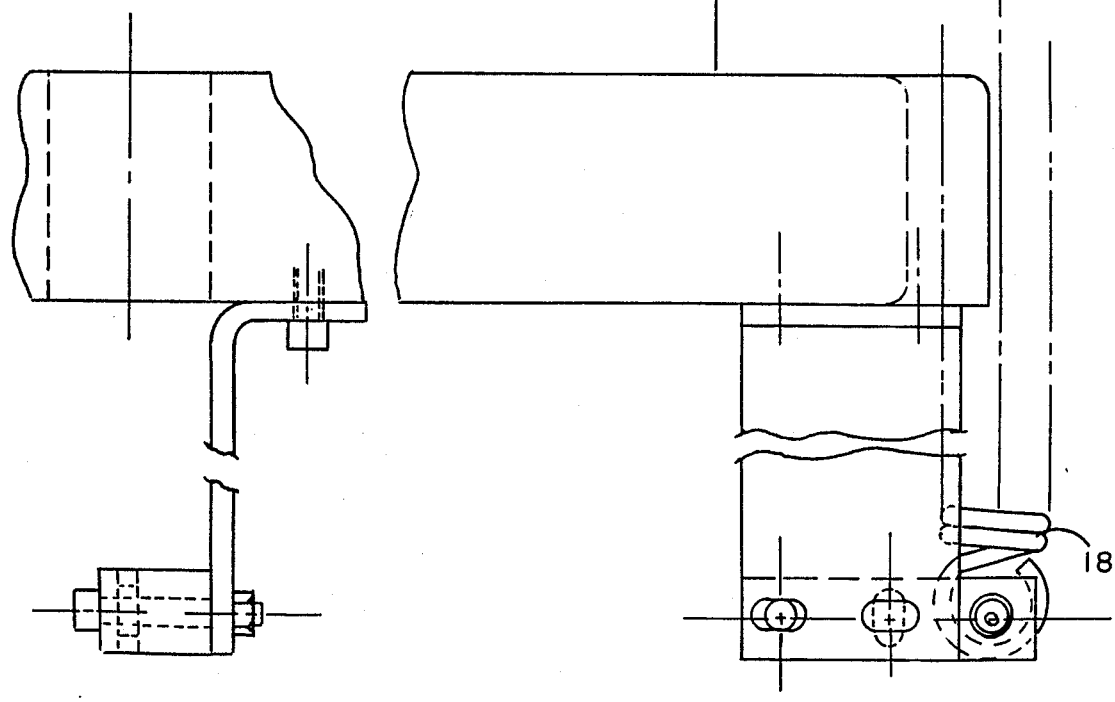

EVACUABLE CHAMBER ENCLOSING

The present invention relates in general to evacuable chamber enclosing and more particularly concerns novel apparatus and techniques for securely enclosing a chamber of relatively large volume that can be evacuated almost completely while allowing relatively easy opening of a heavy cover by one person without extra heavy lifting equipment.

A chamber for processing substrates with an ion beam is normally evacuated almost completely. An evacuated chamber must withstand essentially full atmospheric pressure. The chamber structure must then be of heavy rugged construction. Typically an ion chamber comprises essentially a hollow cylinder with a thick steel wall secured to a thick steel base and covered by a heavy thick steel cover bolted to the cylinder. Owing to the need for dimensional stability being maintained between substrate and ion beam source, the support structures are typically heavy in order to achieve rigidity as well as high thermal mass. For example, changes due to barometric pressure can cause error-producing mechanical deformations of the vacuum containment structure if not properly designed. In a typical prior art approach, a hoist is required to lift the cover after being unbolted to gain access to the inside of the chamber. The cover must then be lowered upon the cylinder while maintaining alignment between holes in the cover and cylinder top for receiving the bolts. Apart from the requirement for the heavy lifting equipment, fastening the cover requires time and care in establishing alignment before inserting the fastening bolts.

It is an important object of this invention to provide an improved evacuable chamber.

According to the invention, an evacuable chamber comprises a hollow cylinder secured to a base and a heavy cover hingeably attached to the top of the cylinder wall boltable thereto in vacuum tight relationship with spring means for counterbalancing the cover to allow easy opening and closing by one person without heavy lifting equipment.

Numerous other features, objects and advantages of the invention will become apparent from the following specification when read in connection with the accompanying drawing in which:

FIG. 3 is a side view of a hinge;

Figure 1:
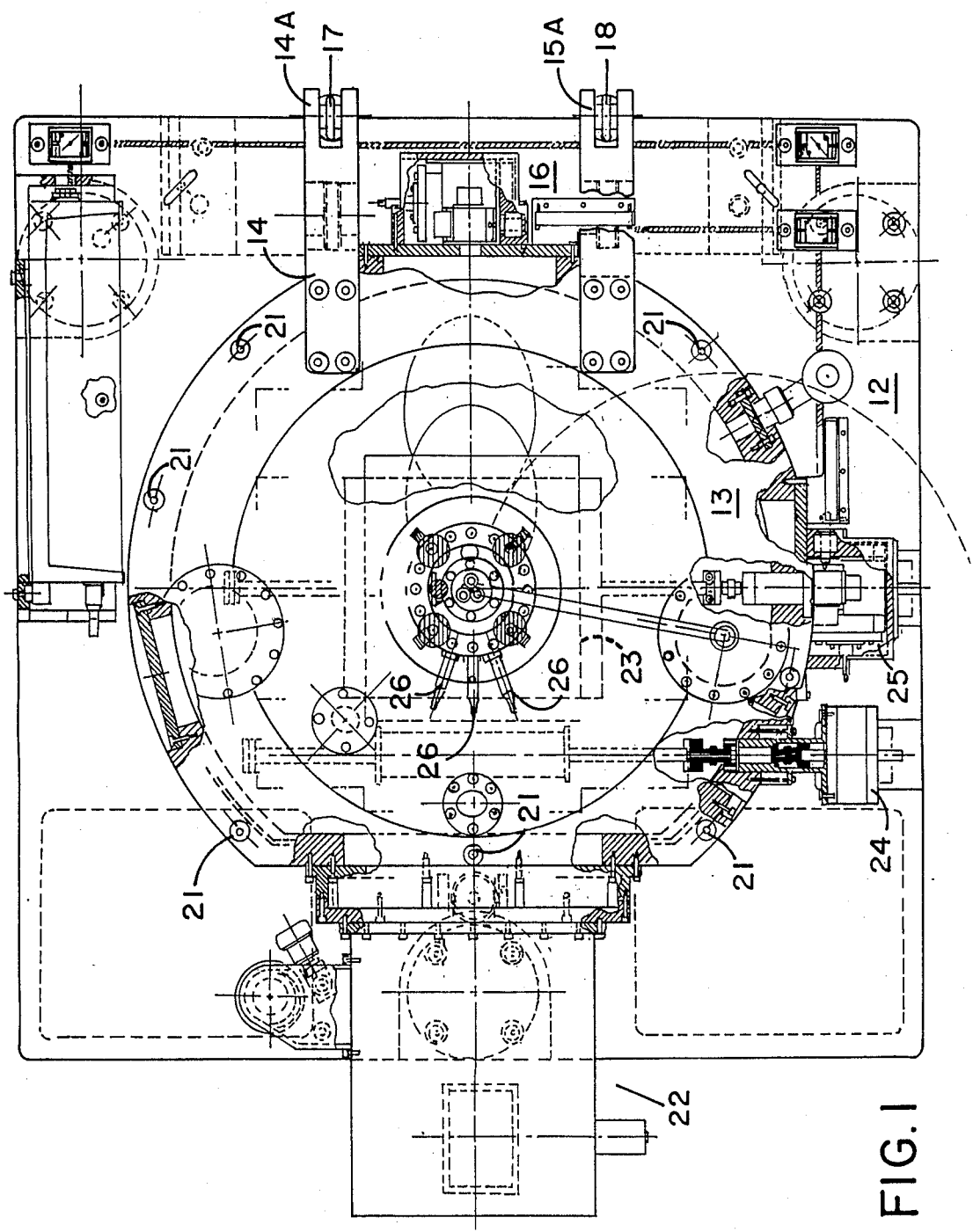
FIG. 1 is a top view of an embodiment of the invention with portions cut away showing some elements in section.

With reference now to the drawing and more particularly FIG. 1 thereof, there is shown a top view with portions cut away to illustrate some internal features, some in section, of an evacuable vacuum chamber according to the invention. The chamber comprises a hollow cylinder 11 secured to a square base 12 and covered by cover 13. Cover 13 is hinged to cylinder 11 by hinges 14 and 15 pivotally attached to a hinge base 16 that is bolted to cylinder 11. Counterbalancing springs 17 and 18 are connected to the outside ends of the arms 14A and 15A of hinges 14 and 15, respectively.

Thirteen bolts 21 securely clamp cover 13 to cylinder 11 in vacuum sealing relationship while compressing an O-ring sealing gasket 31 shown partially in FIG. 3. Module 22 provides ingress and egress into the chamber for substrates positioned on platform 23 whose y and x positions are controlled by y motor 24 and x motor 25, respectively, and associated mechanisms.

Figure 2:
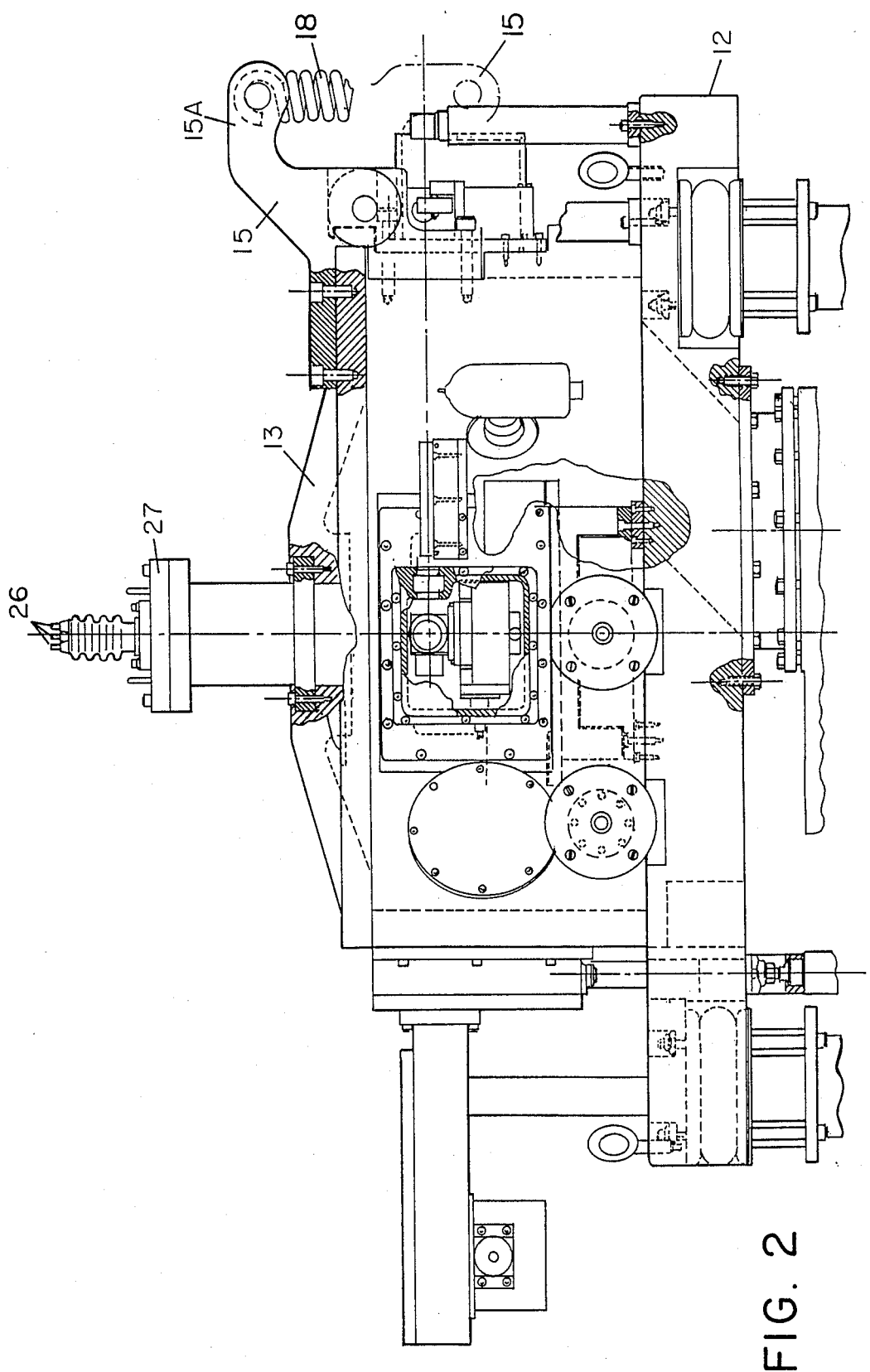
FIG. 2 is an elevation view of the embodiment of FIG. 1 with portions cut away to illustrate certain internal features, some of which are shown in section.

Referring to FIG. 2, there is shown an elevation view of the embodiment of FIG. 1 with portions cut away to expose some internal features, some of which are shown in section. The same reference symbols identify corresponding elements throughout the drawing. FIG. 2 shows hinge arm 15A in dash-dotted outline when cover 13 is fully open and vertically aligned to form an angle of substantially $90\times$ with the horizontal. Spring 18 is fragmentarily illustrated, its lower end being connected to base 12.

Referring to FIG. 3, there is shown a fragmentary side view of the structure illustrating certain features of the hinge. Spring 18 is shown with its upper part cut away while the attachment to base 12 is visible. The end of arm 15A is shown in dash-dotted outline in the position it occupies when cover 13 is fully open. O-ring 31 is a sealing gasket for establishing a vacuum-tight seal between cover 13 and cylinder 11. Hinge 15 includes a slotted hole 15B to allow cover 13 to pivot about O-ring 31 when closing and an adjustable stop 15C. Set screws 32 bearing against plastic washers may be adjusted to provide a desired degree of friction if needed to keep cover 13 open and allow gentle closing.

Figure 4:
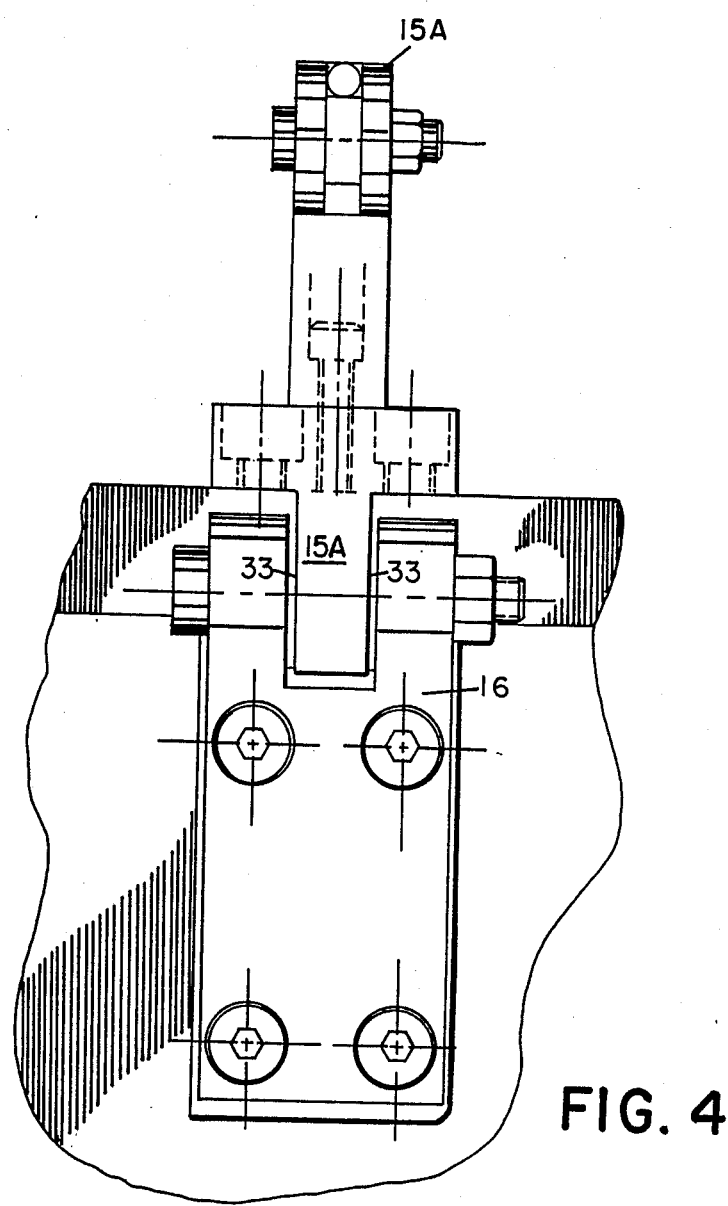
FIG. 4 is an end view of a hinge.

Referring to FIG. 4, there is shown a fragmentary view of the structure illustrating the outside portion of hinge 15 in elevation. Nylon thrust washers 33 sandwich the portion of arm 15A about the hinge axis.

The invention allows one person to open the chamber, thereby providing quick access to the interior of the vacuum chamber; i.e., the x-y stage system and substrate as well as the lower portion of the ion beam column. The need for external lifting equipment (which may or may not be readily available) is eliminated. As a result the rapid access which is allowed for servicing tends to reduce the servicing time and benefits the user by having greater "up" time for operating the machine. This is an important consideration among high-technology machines of this nature.

Figure 5:
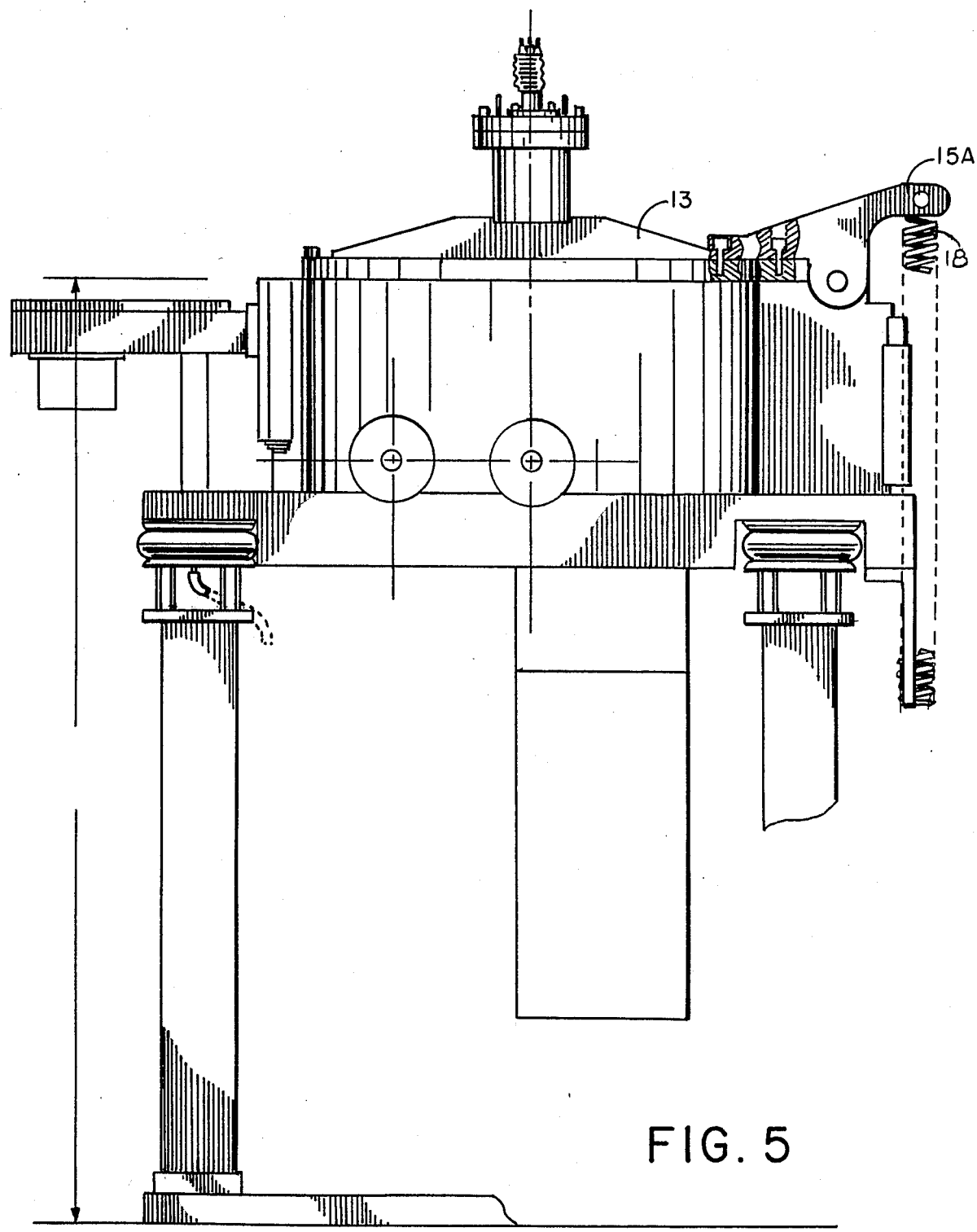
FIG. 5 is a pictorial elevation view of an embodiment of the invention with the cover closed.
Figure 6:
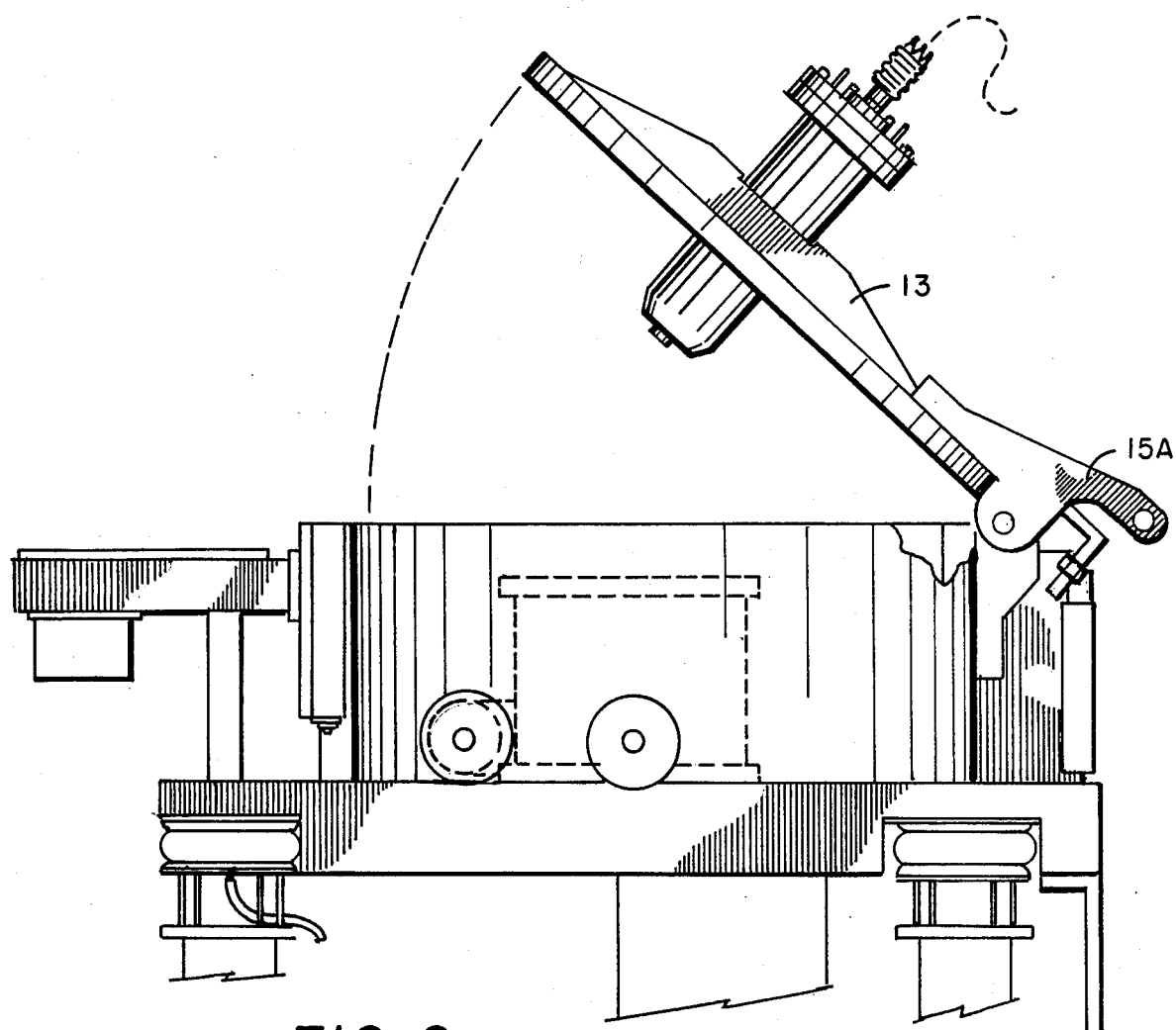
FIG. 6 is a pictorial fragmentary elevation view of the embodiment of FIG. 5 with the cover open.

Referring to FIG. 5, there is shown a pictorial elevation view of an embodiment of the invention with cover closed. FIG. 6 shows a pictorial fragmentary elevation view with cover open. Access to components within the vacuum enclosure is readily provided for a person of average height.

Figure 7:
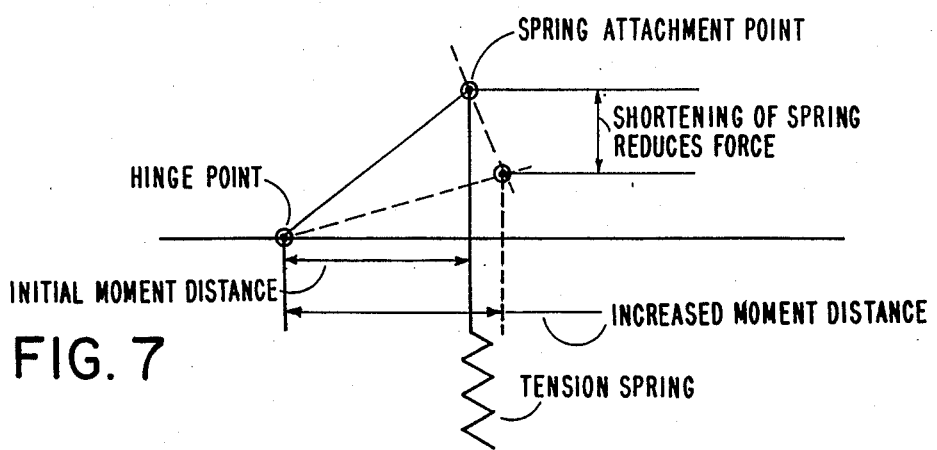
FIG. 7 is a schematic diagram helpful in understanding balancing moments.

The invention takes advantage of compensating for the reduced spring force (as the spring shortens during cover opening) by increased moment distance about the hinge point as the hinge arm rotates from its initial position toward zero (horizontal) as shown in FIG. 7.

The invention also minimizes the angular excursion of the spring attachment point due to space restrictions.

Prior art such as used on submarine hatches typically uses a torsion spring mounted concentrically with the hinge axis. Such springs are typically heavy and cumbersome. A major disadvantage is that the linear reduction in torque with respect to angle does not allow matching the torque required as shown in FIG. 8.

Figure 8:
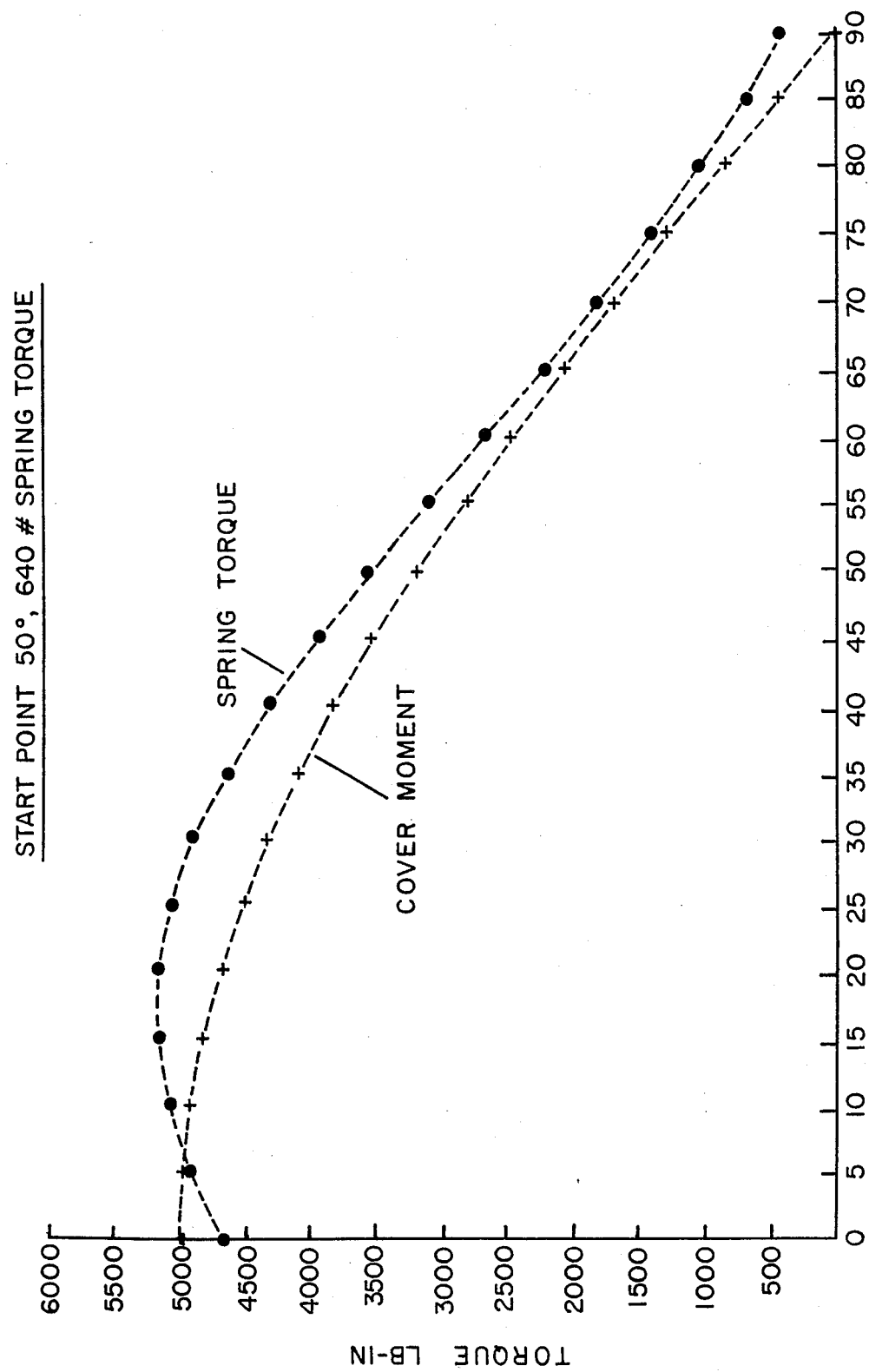
FIG. 8 is a graphical representation of cover moment and spring torque as a function of cover angle relative to the horizontal.

Referring to FIG. 8, there is shown a graphical representation of lid torque and spring countertorque about the hinge axis as a function of cover angle. This graphical relationship shows that the invention effectively counterbalances the heavy cover torque over the full 90° range between fully closed and fully open while the spring provides just enough additional torque at 90° to keep cover 13 upright in the open position and is just short enough of torque at 0° so that cover 13 remains closed when horizontal.

In a specific embodiment of the invention the weight of cover 13 was of the order of 275 pounds and made of iron of the order of 1.25 inches thick. Springs 17 and 18 were closed wound extension steel springs 18.25 inches long when cover 13 was open and having a spring constant of the order of 54 pounds per inch and initial tension of the order of 60 pounds.

There has been described novel apparatus and techniques for selectively opening and closing a heavy cover of an evacuable vessel by a single person without auxiliary hoisting equipment. It is evident that those skilled in the art may now make numerous uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. In a heavy evacuable vessel having a wall seated on a base and cover means for coacting with said wall and base for sealing said evacuable vessel in vacuum tight relationship while being capable of withstanding atmospheric pressure when the vessel is evacuated the improvement comprising, hinge means having a hinge axis for hingeably attaching said cover means to said wall allowing said cover means to pivot about the hinge axis between a closed position in which the cover means is substantially horizontal and an open position in which the cover means is substantially vertical, and spring means connected between said cover means and said base for counterbalancing the moment of said cover means about said hinge axis over a range between said cover means being substantially horizontal and said cover means being substantially vertical.

2. The improvement in accordance with claim 1 wherein the counterbalancing torque provided by said spring means is slightly less than the moment of said cover means about said hinge axis when said cover means is substantially horizontal and slightly greater than the cover moment when said cover means is substantially vertical.

* * * * *